(12) United States Patent
Blair

(10) Patent No.: US 7,114,633 B1
(45) Date of Patent: *Oct. 3, 2006

(54) EASY USE VALVED FLUID CONTAINER ASSEMBLY AND VALVE SYSTEM FOR SAME

(76) Inventor: James F. L. Blair, 10 N. Locust, Box 66, Shannon, IL (US) 61078

( * ) Notice: Subject to any disclaimer, the term of this patent is extended or adjusted under 35 U.S.C. 154(b) by 126 days.

This patent is subject to a terminal disclaimer.

(21) Appl. No.: 10/313,224

(22) Filed: Dec. 9, 2002

(51) Int. Cl.
*B67D 5/08* (2006.01)

(52) U.S. Cl. ............................ 222/56; 222/64; 222/67; 141/291; 141/348; 141/349

(58) Field of Classification Search ................ 222/51, 222/56, 64, 65, 67; 248/146, 147, 149; 239/302, 239/375–377, 379; 137/433, 400, 614.2; 141/192, 198, 206, 210, 216, 217, 220, 223, 141/224, 228, 229, 291–294, 346–352
See application file for complete search history.

(56) References Cited

U.S. PATENT DOCUMENTS

| 166,260 | A | * | 8/1875 | Clark | ..................... 239/142 |
| 4,098,307 | A | * | 7/1978 | Taylor | ..................... 141/220 |
| 6,619,341 | B1 | * | 9/2003 | Cushing | ..................... 141/198 |
| 2003/0150964 | A1 | * | 8/2003 | Sherer et al. | ............... 248/146 |

* cited by examiner

*Primary Examiner*—Frederick C. Nicolas
(74) *Attorney, Agent, or Firm*—Kajane McManus

(57) ABSTRACT

The valved container assembly comprises a container positionable on an adjustable stand. The container incorporates an outlet tube adjacent the bottom of the container, the outlet tube incorporating an inline flow control valve and an end valve which stops flow through the tube when flow into a receptacle for fluid from the container reaches a height below overflow.

14 Claims, 3 Drawing Sheets

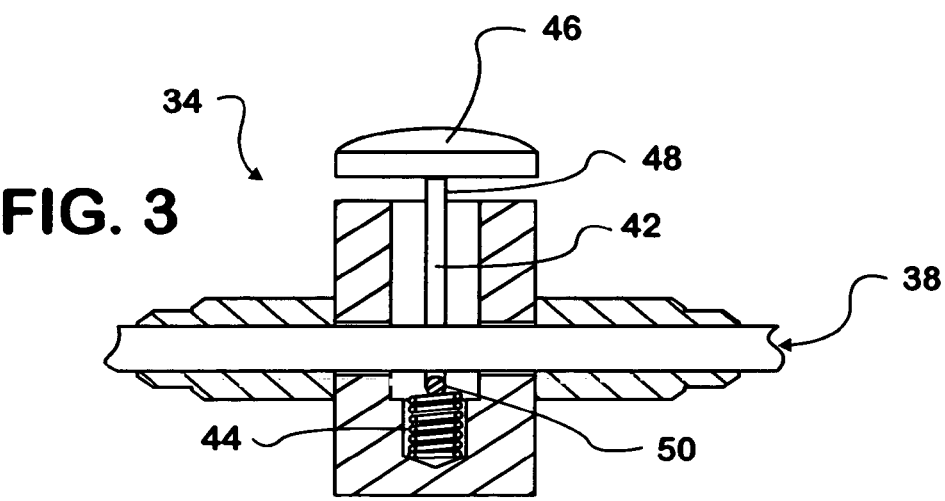
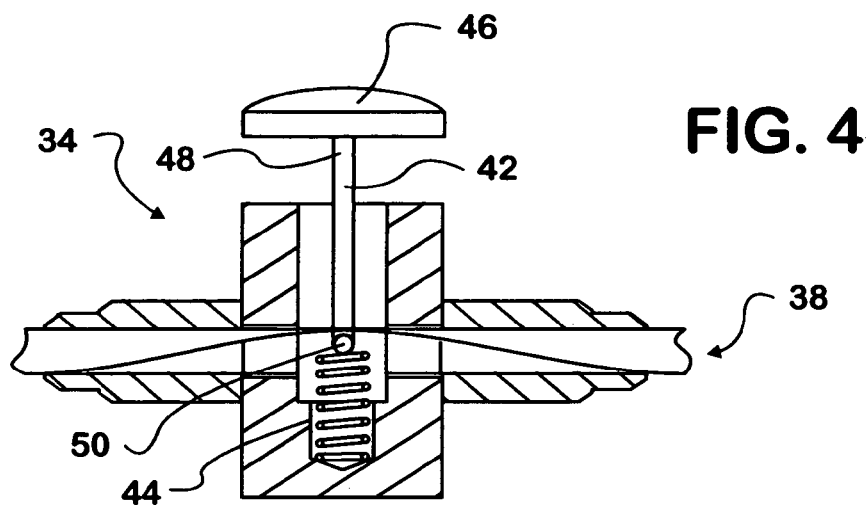
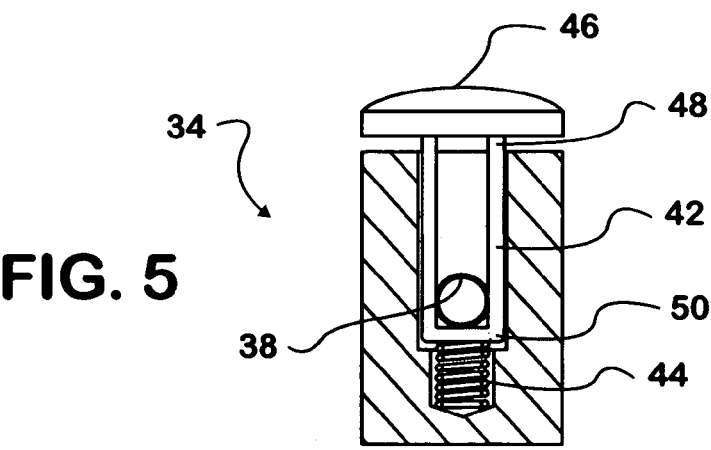

EASY USE VALVED FLUID CONTAINER ASSEMBLY AND VALVE SYSTEM FOR SAME

BACKGROUND OF THE INVENTION

1. Field of the Invention

The present invention relates to a valved fluid container assembly including a container, such as, for example, a gas can, which is easy to use compared to those presently available and includes a valve system for greater accuracy in filling a device with fluid from the container, and for controlling flow of fluid from the container, the assembly further incorporating a stand for the container.

2. Prior Art

Heretofore, various liquid containers have been proposed. Also valved liquid containers have been proposed.

However, none have provided the ease of use and valving system which is described in greater detail hereinbelow.

SUMMARY OF THE INVENTION

According to the invention there is provided a valved container assembly comprising a fluid container, the container incorporating an inlet thereto and an outlet therefrom adjacent a bottom of the container, the outlet incorporating an outlet tube, the outlet tube incorporating an inline valve for controlling flow of fluid through the tube, and the outlet tube further incorporating an end valve which acts to stop flow of fluid through the outlet tube before fluid exiting the outlet tube can cause an overflow from an item into which fluid from the container is flowing.

Further, according to the invention there is provided an inline valve for use in controlling flow through a flow line, the valve comprising a proximal end and a distal end mechanically engaged within and to the flow line, the valve incorporating a compressible tube therein and a stopper engaged about the compressible tube and being spring biased to maintain the tube in a compressed state so no flow can pass therethrough until force is applied onto the stop member against action of the biasing spring to allow decompression of the compressed tube for flow to pass therepast.

Still further, according to the invention there is also provided an end valve for use in a flow line to keep fluid passing through the flow line from overflowing an item into which fluid is being delivered by the flow line, the end valve having a proximal end and distal end and including a valve element in the proximal end, the valve element being configured to allow fluid flow therearound; a valve seat which is normally biased by a spring against the valve element, the valve seat defining an entry into an outflow channel which allows fluid to flow out of the distal end of the valve when action of the biasing spring is overcome; a movable float engaged slidably about a wall defining the outflow channel, a leaf spring having an arcuate configuration positioned between the float and the wall, the leaf spring having a proximal end positioned relative to the seal element in a manner to maintain the seal element away from the valve seat when adjacent a distal end of the seal element, when the seal element and valve seat are manually separated, the leaf spring being forced out of engagement with the distal end of the seal element by elevation of the float due to fluid contact therewith; the float and valve elements being housed within a cage and the cage having ports therein through which fluid can pass to cause elevation of the float to cause the valve to close off further outflow therethrough.

BRIEF DESCRIPTION OF THE DRAWINGS

FIG. 3 is a cross sectional view through an inline valve of the assembly showing same in an open condition.

FIG. 4 is a cross sectional view through the valve of FIG. 3 showing same in an open condition position.

FIG. 5 is a cross sectional view of the valve of FIG. 3 perpendicular to the cross section of FIG. 3.

DESCRIPTION OF THE PREFERRED EMBODIMENTS

Figure 1:
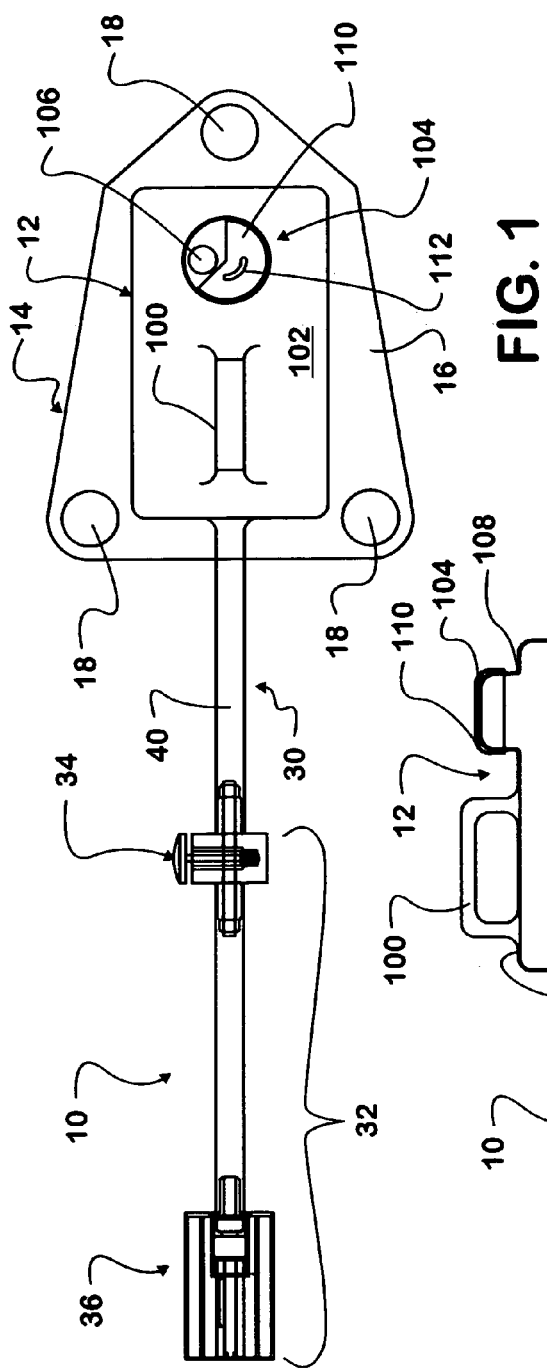
FIG. 1 is a top plan view of the valved container assembly.
Figure 2:
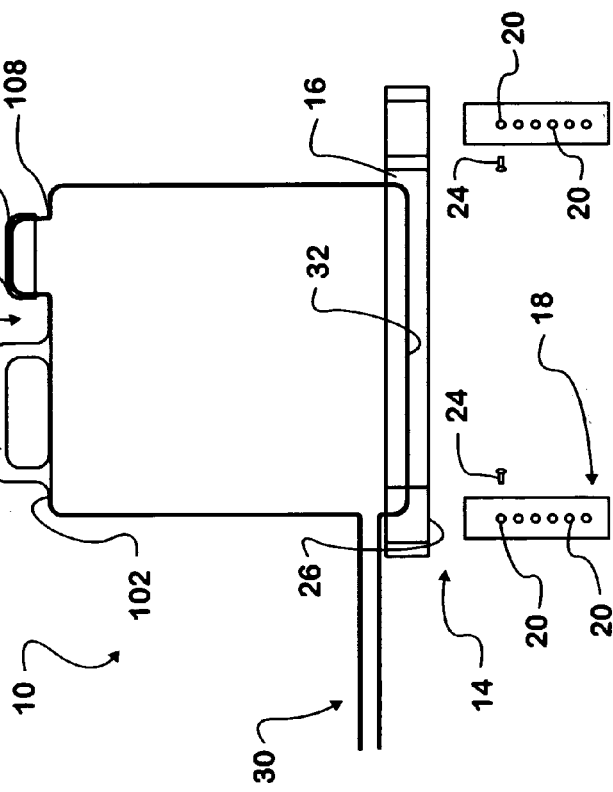
FIG. 2 is a perspective view of the container of the assembly when viewed from one side thereof, showing an adjustable stand therefor, provided for ease of use thereof.

Referring now the drawings in greater detail, there is illustrated therein the easy use fluid container assembly with valving system for same, made in accordance with the teachings of the present invention and generally identified by the reference numeral 10.

As shown, the assembly 10 includes a container 12 which is designed to receive, hold, and ultimately dispense fluid therefrom. In the illustrative embodiment presented, the container 12 is shown to comprise a gas can 12, though this should not be construed as limiting.

Fluid containers 12, such as gas cans 12, are known to be of significant weight when filled, particularly when they are of large capacity, such as gas cans 12 used for filling boat motors (not shown). Such significant weight is, at best, unmanageable when emptying a conventional can provided with a typical top mount nozzle supplied with such can, especially when a woman attempts to lift such can and tilt same simultaneously for emptying thereof.

It is well known that due to the structure of such conventional cans, spillage of fluid, such as gasoline, is often unavoidable, although extremely undesirable.

The assembly 10 of the present invention overcomes these undesirable features.

First, a stand 14 is provided upon which the can 12 may be rested. Such stand 14, in a preferred embodiment, will comprise a tray 16 with removable legs 18, for easy storage. Now, the container 12 need merely be vertically elevated onto the stand 14 and need not be held during use.

It will by seen that the legs 18 are adjustable in height, having a plurality of spaced apart vertically aligned bores 20 therein. The legs 18 are slidably received in openings 22 provided in the base 14, and any suitable structure, such as a pin 24 may protrude from one bore 20 in each leg 18, engaging a bottom surface 26 of the base 14, setting the base 14 at a desired height from a supporting surface for same (not shown).

Secondly, rather than draining the container 12 through a top mounted nozzle which would require tilting thereof, the container 12 is provided with a valved drain hose 30 adjacent a bottom wall 32 of the container 12, so action of gravity will assist in drainage of the container 12.

Flow from the container 12 must be controllable. Such is accomplished in the present embodiment by a valve system 32 incorporated into the drain hose 30, the illustrated valve system 32 incorporating two valves 34 and 36. A first of the valves 34, will be referred to as an inline valve 34 while the second of the valves 36 will be referred to as the end valve 36.

The inline valve 34 will be seen to incorporate a flexible fluid passageway or tube 38 therethrough which is in line with a lumen 40 of the drain hose 30. Extending transversely to and passing diametrically about the tube 38 is a U-shaped stopper 42 which is biased by a spring 44 to a normally closed position as shown in FIG. 4, to keep fluid from passing therethrough by pinching the tube 38 closed.

The stopper 42 includes a knob 46 at an end 48 opposite the spring biased end 50 which is manually manipulated and held downwardly to force the stopper 42 against action of the biasing spring 44 when it is desired to deliver fluid from the container 12.

It will be understood that when the stopper 42 is in the depressed position, as best shown in FIG. 5, the tube 38 of the valve 34 flexes open and fluid is allowed pass through the hose 30 to the end valve 36. Upon release of the knob 46, the valve 34 closes.

Figure 6:
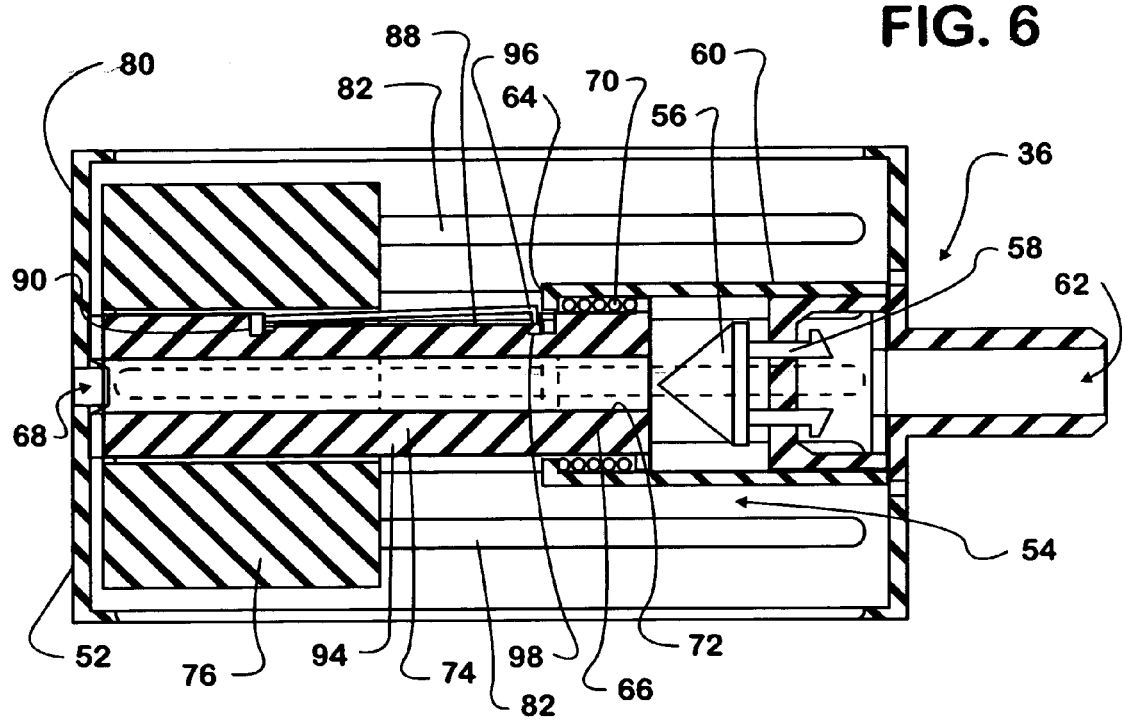
FIG. 6 is a cross sectional view through a second valve of the valve system showing the valve in an open condition.
Figure 7:
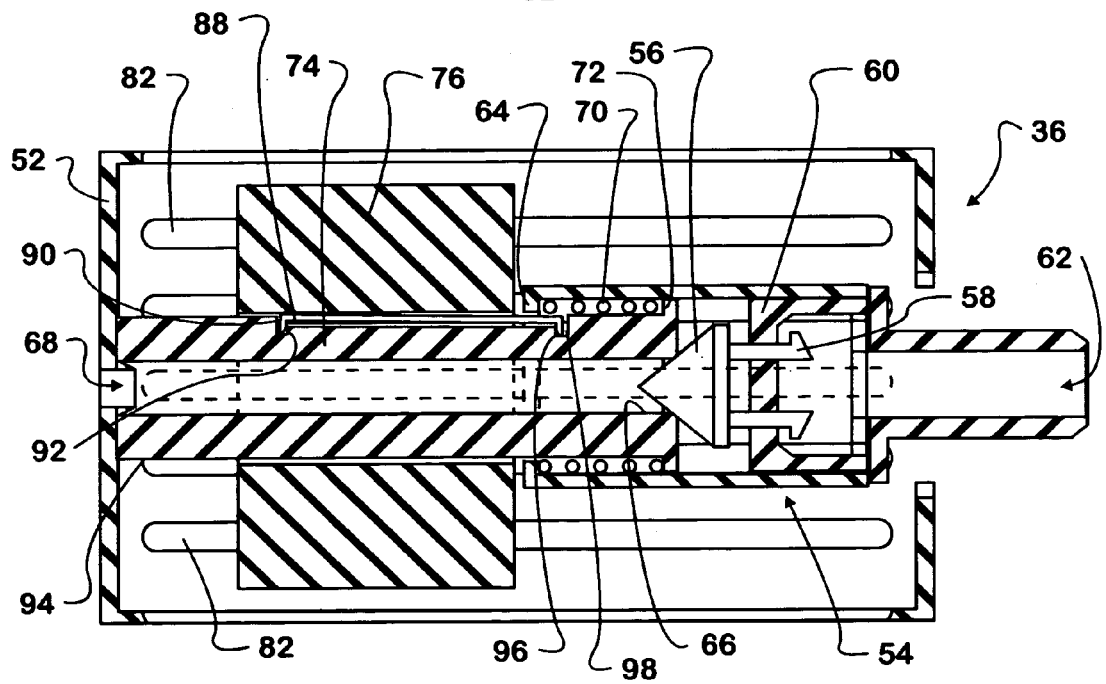
FIG. 7 is a cross sectional view through the valve of FIG. 6 showing same in a closed condition.

Turning now to FIGS. 6 and 7, depicting the end valve 36 of the assembly 10, it will first be understood that in use, a distal or depending end 52 of the valve 36 is placed downwardly into an item to be filled from the container 12.

The end valve 36 is seen to include a seal 54 having a conical head 56 in the illustrated embodiment which engages via a ported neck 58 to a seal housing 60. The neck 60 is ported to allow flow from a proximal channel 62 therethrough and around the conical head 56, when the valve 36 is in an open position thereof. The housing 60 is also seen to include an inwardly extending flange 64 on a distal end thereof which will further be discussed below.

The conical head 56 seats within a proximal end 66 of an outflow channel 68 when the valve 36 is in its normally closed position. The seal 54 is biased toward the channel 68 by a biasing spring 70 interposed between a proximal end flange 72 of a defining wall 74 of the channel 68 and a distal end flange 64 of the seal housing 60, the seal housing end flange 64_ being distal to the proximal end flange 77.

The channel wall 74 has positioned thereabout a float 76 which rides along the channel wall 74 from the distal end 52 of the valve 36 up to a point where it abuts the distal flange 64 of the seal housing 60.

Surrounding the above structures and enclosing same therein is a cage 80 which is fixed to the channel wall 74 at the distal end 52 of the valve. The cage 80 has a plurality of ports 82 therein through which liquid can enter the cage 80 from within the item being filled.

It will be understood that, with the distal end 52 of the valve 36 being downwardly disposed in the item being filled should fluid in the item rise to a level to enter the cage 80 via the ports 82, the float 76 will be moved proximally.

Provided between the float 76 and the channel wall 74 is an elongate leaf spring 88 which extends along the channel wall 74 from a position somewhere under the float 76 when the float 76 is in the most distal position thereof, to a point proximal to the distal flange 64 of the seal housing 60 when the valve 36 is in a closed position thereof.

The leaf spring 88 includes a distal flange 90 which seats within a groove 92 in an exterior surface 94 of the channel wall 74 and also includes a proximal flange 96 which also seats within a groove 98 when the seal housing 60 engages thereover.

The proximal flange 96 is also positioned within the valve 36 such that, when it elevates out of the groove 98 due to the flexed arcuate configuration thereof, it abuts against the distal flange 64 of the seal housing 60, holding the vale 36 open against action of the biasing spring 70.

This open position is maintained until the float 76 rides proximally a sufficient distance to overcome the flexure of the leaf spring 88 pushing the proximal flange 96 into the groove 98, allowing the biasing spring 70 to expand and return the valve 36 to its normally closed position.

Thus, by motion of the float 76, which is moved by the rising level of fluid in the item being filled from the container 12, overflow of fluid from the item being filled, is avoided.

Turning back to the container 12, in the preferred embodiment, a carrying handle 100 is provided on a top surface 102 thereof.

Also, provided on the top surface 102 is a fill inlet 104 which, in the preferred embodiment, includes a fill opening 106 in an elevated neck 108, with a rotatable cap 110 seating over the neck 108 for use in closing off the fill inlet 104. Further, if desired, a vent opening 112 can be provided in both the cap 110 and neck 108 which align when the cap 110 is rotated to allow access to the fill inlet 104, to allow for venting of air from within the container 12 as liquid is filling the container 12.

As described above, the assembly 10 provides a number of advantages, some of which have been described above and others of which are inherent in the invention. Also, modifications to the structures disclosed herein may be proposed without departing from the teachings herein. Accordingly, the scope of the invention is only to be limited as necessitated by the accompanying claims.

The invention claimed is:

1. A valved container assembly comprising a container for a fluid, the container incorporating an inlet thereto and an outlet therefrom adjacent a bottom of the container, the outlet incorporating an outlet tube, the outlet tube incorporating an inline valve for controlling flow of the fluid through the tube, and the outlet tube further incorporating an overflow control end valve which is maintained normally closed by a biasing spring which maintains a seal element within a cooperating valve seat with the valve and acts to stop flow of the fluid through the outlet tube before the fluid exiting the outlet tube can cause an overflow from an item into which the fluid from the container is flowing.

2. The assembly of claim 1 wherein a stand for holding the container is provided.

3. The assembly of claim 2 wherein the stand is adjustable in height.

4. The assembly of claim 1 wherein the inline valve is a normally closed valve including a compressible tube therein which is pinched closed by a spring biased stopper.

5. The assembly of claim 4 wherein the normally closed valve includes a depressible knob which depresses the stopper and opens flow through the valve.

6. The assembly of claim 5 wherein the stopper is returned to its normally closed position by a biasing spring when depression of the knob ceases.

7. The assembly of claim 1 wherein the valve seat defines an entry into an outflow channel defined by a channel defining wall which in turn is surrounded by a float movable along a length thereof.

8. The assembly of claim 7 wherein the channel defining wall is fixed to a valve cage at a distal end thereof.

9. The assembly of claim 8 wherein the cage includes fluid ports extending therethrough.

10. The assembly of claim 9 wherein the cage is inserted into an item being filled with fluid from the container in a manner where the distal end thereof is downwardly disposed.

11. The assembly of claim 10 wherein the float of the assembly rises as fluid enters through the fluid ports in the cage.

12. The assembly of claim 11 wherein a flexible arcuate leaf spring is engaged at a first end thereof between the float and the channel defining wall.

13. The assembly of claim 12 wherein the leaf spring biases the valve seat away from the seat element.

14. The assembly of claim 13 wherein the float flexes the leaf spring out of a biasing position as it rises such that, when the leaf spring is no longer biasing the valve seat away from the seat element, the spring biasing the valve normally closed is released to seat closure within the moveable channel, closing the valve.

\* \* \* \* \*